United States Patent [19]
Hirohata et al.

[11] 4,390,262
[45] Jun. 28, 1983

[54] ELECTROMAGNETICALLY OPERATED DIAPHRAGM SHUTTER

[75] Inventors: Michio Hirohata, Inagi; Yukio Ogawa; Tetsuya Taguchi, both of Kawasaki, all of Japan

[73] Assignee: Canon Kabushiki Kaisha, Tokyo, Japan

[21] Appl. No.: 304,936

[22] Filed: Sep. 23, 1981

Related U.S. Application Data

[63] Continuation of Ser. No. 86,523, Oct. 19, 1979, abandoned.

[30] Foreign Application Priority Data

Oct. 23, 1978 [JP] Japan .................................. 53-130829
Dec. 1, 1978 [JP] Japan .................................. 53-148677

[51] Int. Cl.$^3$ ............................................. G03B 9/08
[52] U.S. Cl. ....................................... 354/230; 354/234
[58] Field of Search ............... 354/230, 234, 235, 271, 354/26, 30, 59; 310/13, 36, 38, DIG. 6

[56] References Cited

U.S. PATENT DOCUMENTS 3,654,845 4/1972 Fahlenberg et al. ................. 354/234
3,975,744 8/1976 Johnson et al. ..................... 354/59 X
4,079,400 3/1978 Kondo .................................. 354/234

FOREIGN PATENT DOCUMENTS 635381 1/1962 Canada ................................. 354/30

*Primary Examiner*—John Gonzales
*Attorney, Agent, or Firm*—Toren, McGeady and Stanger

[57] ABSTRACT

An electromagnetic diaphragm shutter mechanism is provided with an electromagnet in the form of a coil or a printed circuit pattern arranged on a sector ring of the shutter mechanism. With a magnetic field applied to the electromagnet, when current is caused to flow therethrough in a prescribed direction, the sector ring is driven to rotate. A light measuring diaphragm mechanism related to the exposure diaphragm of the shutter blades serves to control the shutter and to improve the accuracy of program control of the shutter, the sector ring being always urged to move in a direction to close the shutter.

56 Claims, 14 Drawing Figures

ELECTROMAGNETICALLY OPERATED DIAPHRAGM SHUTTER

This is a continuation of Ser. No. 086,523, filed Oct. 19, 1979, abandoned.

BACKGROUND OF THE INVENTION

This invention relates to electromagnetically operated program shutters, and more particularly to a drive mechanism and a control mechanism which are capable of improving the accuracy, and reliability of exposure control.

The general trend of many shutters for use in photographic cameras or the like was to make use of the power of restitution of a charged spring as the drive source therefor. Recently, however, as the technique of applying electronics to the camera art advances, an electromagnetic device has found increasing acceptance in the drive source of the camera shutter. Such an electromagnetically driven shutter must allow for a reduction in the necessary number of constituent parts thereof and for the removal of the mechanism for charging the drive spring. Furthermore, it must advantageously reduce the production cost as compared with the conventional spring powered type shutter.

The conventional type of electromagnetically operated shutter necessarily employs a mechanism for transmitting driving power from the electromagnetic device to the shutter blades which leads to a relatively large loss in electrical energy. In application to small size cameras, therefore, many problems in respect to the electrical power source or battery are left unsolved.

It is also known to provide an electromagnetically operated shutter of such construction that the electromagnetic device is connected directly to the shutter blades, with a sector ring as the drive member for the shutter blades arranged to be rotatable within the magnetic field of the device. Since various limitations arise, for example, with respect to space, weight and, among others, current capacity, in order to increase the magnetic flux and the intensity of current flowing in that magnetic flux, therefore, many problems must be solved. For example, the rating of the coil must be increased, the efficiency of transmission of the power in the mechanical system must be improved, and a closed magnetic circuit must be formed so that the thus increased magnetic flux has no influence on the motion of the movable parts such as the sector and shutter blades. Further, the movable parts of the electromagnetic device must be made as light as possible.

SUMMARY OF THE INVENTION

An object of the present invention is to provide for an electromagnetically operated diaphragm shutter of the character described with a light measuring optical path separate from the exposure light path to enable exposure control with high accuracy, while still maintaining a simple and effective construction thereof.

Another object of the present invention is to provide an electromagnetically operated diaphragm shutter having the above-described separate light measuring optical path and further provided with means for holding the weight balance of the sector ring.

Another object of the present invention is to provide an electromagnetically operated diaphragm shutter utilizing the above-described weight balance holding means effectively in controlling the operation of the shutter.

Another object of the present invention is to increase the transmission efficiency of a mechanical system in the electromagnetically operated program shutter described above.

Another object of the present invention is to provide an improved electromagnetically operated diaphragm shutter which may be driven to undergo necessary and sufficient movement with lower electrical power by reducing the weight of the movable parts and by limiting the range of movement thereof to a minimum.

Another object of the present invention is to minimize the time lag from a time at which a signal for closure of the shutter has occurred to a time at which the shutter starts to close and to provide for the shutter a construction rendering it possible to effect a real time control as the influence of the deviation of the time lag from the ideal value on the exposure control is minimized.

Another object of the present invention is to provide a construction capable of narrowing the gap between the magnetic poles to increase the magnetic force between the magnetic poles of the electromagnetic members.

According to an embodiment of the present invention, a coil is positioned on the sector ring of the shutter mechanism so that the magnetic field acts on said coil to directly drive the sector ring for movement, whereby the transmission efficiency of the mechanical system is increased.

Moreover, effective use of magnetic material is achieved in forming the magnetic field so that the entire structure is of light weight and small size.

According to an embodiment of the invention, the shutter mechanism is urged by a spring to move in the direction opposite to that in which the shutter is opened and in the forward direction when the shutter is closed, so that the influence of the time lag from the occurrence of the shutter closing signal to the initiation of closing movement of the shutter on the exposure can be minimized. Therefore, use thereof as the program shutter leads to significant improvement in the accuracy of exposure control.

Furthermore, since the electromagnetic force is directly applied to the sector ring of the shutter mechanism, the necessary number of constituents of the shutter is reduced providing advantages of economy and reliability.

According to the invention, the coil is made thinner in the axial direction, and, because the direction of movement is perpendicular to the optical axis, the shutter is also made thinner with the resultant gap being narrowed to strengthen the magnetic field.

Since the sector ring is circular in shape an continuous, and the direction of movement is through an angle O, no pumping effect is produced during movement. Therefore, there is no need to provide any air communicating holes, so that the casing of the shutter may be of an air-tight structure and dust-proof without causing the motion of the shutter to be varied.

Again, since the sector ring is circular in shape and continuous, the weight of the sector ring is distributed uniformly over the entire body thereof. Therefore, even when the camera experiences a shock, there is little possibility of causing the shutter to be unintentionally opened.

In further accordance with the present invention, the sector is biased by a spring in a direction to close the shutter and the likelihood of accidential opening is further diminished. This spring also serves to prevent the film from being entirely damaged by overexposure as the shutter is automatically closed under the action of the spring when the electrical power supply is accidentally cut off at a time during the operation of the shutter.

With the present invention, the direct drive of the sector ring and the simplicity of construction give rise to a feature whereby the time lag from a time at which the electrical control signal for the closure of the shutter has been entered to a moment at which the closing of the shutter is initiated is on the order of about 1.5 milliseconds to permit a real time light metering aspect to be used in controlling the exposure. (For example, 1/500 second corresponds to 4 milliseconds in terms of a triangle wave along which the shutter is opened and closed. Thus, it is noted that 1.5 milliseconds is shorter than 4/2 or 2 milliseconds).

Further in accordance with the present invention, the yoke and sector ring are provided with a number of through holes in alignment with the respective hollow cores of the coil elements. Therefore, one of the hole arrangements can be used in establishing a light path for the auxiliary diaphragm, another in fixedly connecting the front and rear lens assemblies to each other on the opposite side of the shutter by a shaft passing therethrough, and another in passing electric lead wires therethrough. Such effective use of the space within the shutter casing is advantageous in facilitating a compactness of the lens barrel of the camera. The provision of the holes in the sector ring leads to reduction in the weight thereof and to increase in the response characteristics of the sector ring. The yoke with such holes also contributes to a reduction in the weight of the shutter.

With the present invention, the sector ring is made by the use of a printed circuit plate to thin the gaps with increase in the strength of the magnetic field. Further, as the substrate of the printed plate, or the cover layer, use may be made of a light-shielding material in a manner to constitute part of the auxiliary diaphragm.

The existence of the copper foil on the printed plate makes it possible to use a soldering technique in securing the sector pins in fixed relation thereto. Also, the spring may be fixedly secured by soldering.

Further, the holding of the sector is effected by lead wires having a resilient property, thereby giving an advantage in that the breakage of the lead wires due to repeated bendings thereof can be prevented, and there is no need to prepare a spare space which accommodates a slack loop of the lead wires.

Further, in making a coil, a thermoplastic coating is applied to the wire so that the coiled wire when later heated is fixed in shape without an excessive core requirement. This also contributes to a reduction of the weight of the sector, and, therefore, to an increase in the response of movement of the sector.

Further, a pair of lead wires tapped from the sector ring take opposite positions to each other so that the lead wires may be constructed in the form of a pair of springs, and, when a printed plate of the type having patterns on both surfaces thereof is used in the sector, the patterns on the opposite surfaces may be made identical to each other so that the lands to which the lead wires are connected may be located at the outside of the sector pins where the lead wires can be most easily tapped out.

According to another embodiment of the present invention, in order to reduce the weight of the shutter itself and to make it possible to use a small size yoke which admits leakage of the magnetic flux to some extent, the shutter blades, control pin therefor, and other movable parts of the shutter are made of a non-magnetic substance. To facilitate a further reduction of the weight of the movable parts, the shutter blades may be made of plastics. In this case, it is required to metallize the front surface of each of the shutter blades, or otherwise the formation thereon of an image of the sun by the objective lens will burn it out. As an example, the sector ring may be formed of an insulated substrate of polyester, or polyimide 0.035 m/m in thickness, with both surfaces of the substrate being coated with a copper layer and then etched out to form a coiled pattern on which an insulated coating of 0.3 m/m thickness is applied. The plastic shutter blades cooperating with the sector of such construction each have a thickness of 0.1 m/m.

The diaphragm shutter of the construction described above, though inferior in strength and hardness to the bending moment (the force in a direction perpendicular to the plane of the shutter blades and the sector ring) as compared to the conventional spring-powered type shutter, can sufficiently withstand the force exerted in a direction parallel to that plane. Since the movable parts of the shutter have a relatively large strength and hardness as far as the direction of movement thereof is concerned, a stopper for limiting the range of movement of the shutter blades at the full open aperture, or for adjusting the diaphragm control at the time of flash photography, can be used and arranged so that when the movable part abuts against the stopper, the reaction is effected only in the direction of movement thereof, to thereby control the size of opening of the shutter. The movable part of the shutter is also provided with a deeply cut portion so that deformation is avoided in all directions except the direction of rotation thereof. Further, to reduce the friction between the movable part and the inner diameter of the stationary part, the movable part is provided with projected portions formed in the inner surface thereof, thereby giving the additional advantage that when a large load is applied thereto, the resultant deformation does not cause the occurrence of a false operation.

DESCRIPTION OF THE PREFERRED EMBODIMENTS

Figure 1:
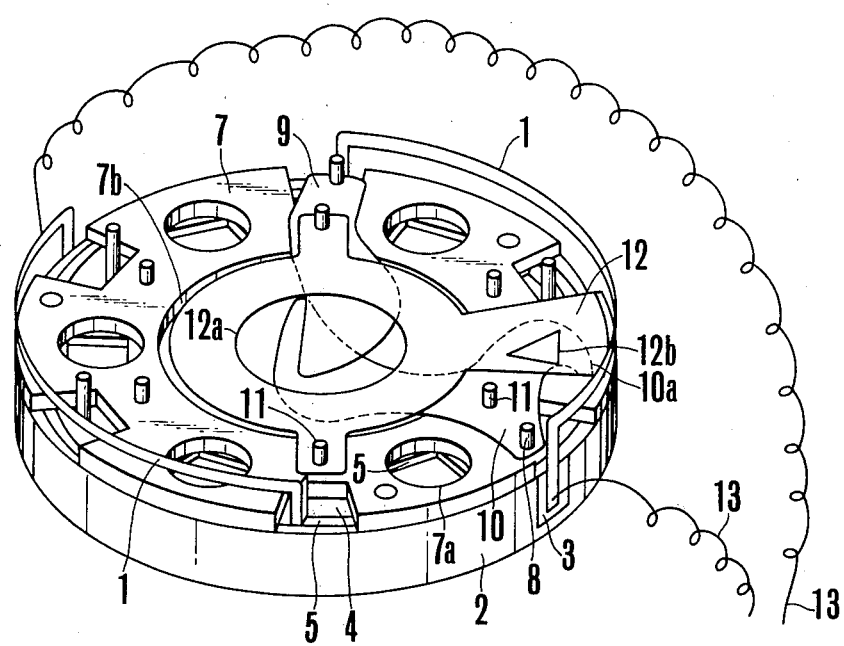
FIG. 1 is a perspective view of a first embodiment of the present invention.
Figure 2:
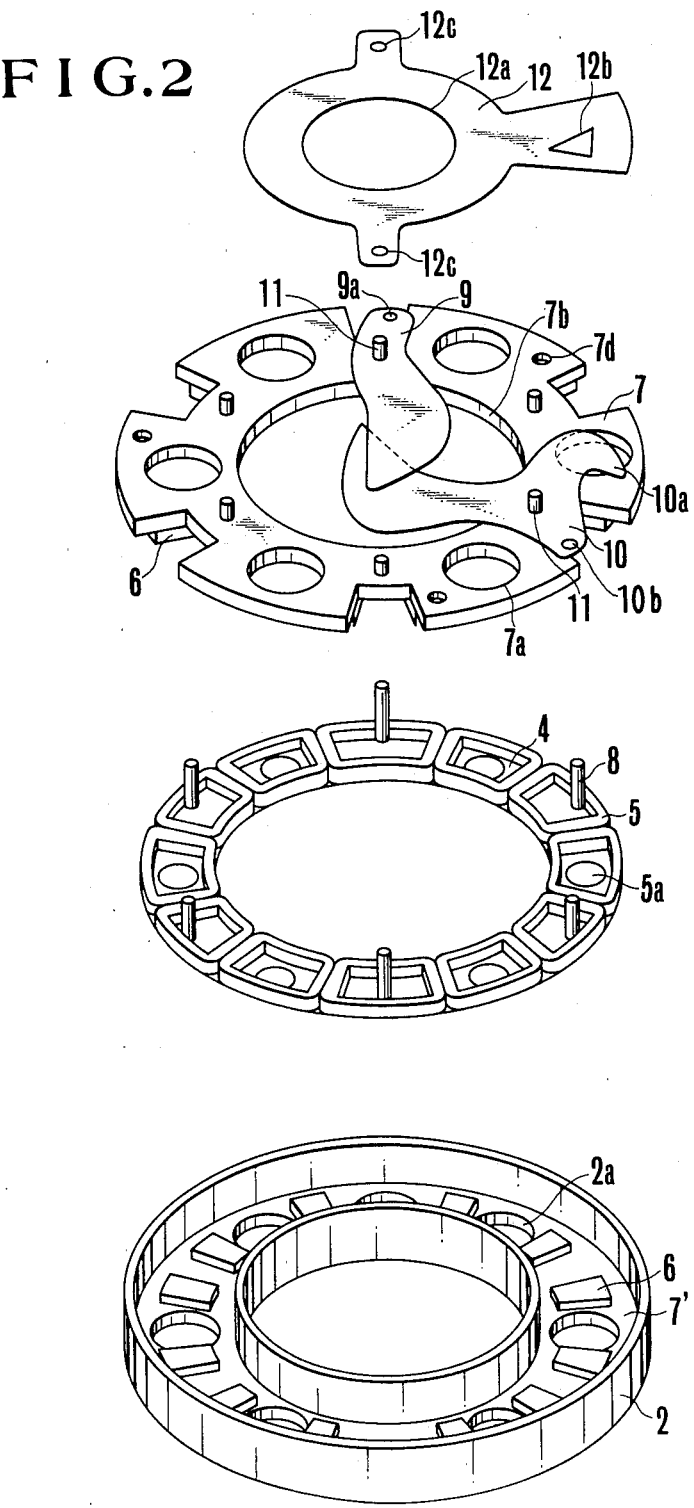
FIG. 2 is an exploded perspective view of the embodiment of FIG. 1.

In FIGS. 1 and 2, there is shown an embodiment of an electromagnetically operated diaphragm shutter according to the present invention including a pair of leaf springs 1 each fixedly secured at one end to a round casing or cover 2 through respective electrically insulated seats 3 at locations diametrically opposite to each other and made of a resilient electrically conductive material such as phosphor bronze. The opposite ends of the leaf springs 1 are electrically connected to a coil element assembly 5 arranged on the upper surface of a sector ring 4 and fixedly secured to the sector ring 4 so that the sector ring 4 is urged to close the shutter.

The cover 2 constitutes together with a substrate 7 a yoke of a magnetic circuit which is formed by a number of permanent magnet pieces 6, and is made of a suitable yoke material such as pure iron. The bottom wall of the cover 2 is provided with a number of small holes 2a, in this instance six holes, bored therethrough to enable light and shafts to be passed through the shutter, and to facilitate the adjustment in position of twelve magnet pieces 6, and with a central large hole for passage of a photo-taking light beam. The seats 3 are made of an electrically insulated material such as ABS in the thin form.

The sector ring 4 is made of a non-magnetic metal, or plastics and fixedly carries twelve coil elements 5 in a common circle on the upper surface thereof. Six sector pins 8 are mounted on the sector ring 4 by fastening or soldering means at the centers of the alternate ones of the coils 6 which are located at the same radial distance from the center of the area of the sector ring, in other words, at six points by which a common circle is divided into equal six parts, while the centers of the other six coils 5 are aligned with respective holes 5a provided through the wall of the sector ring 4 to enable light or the shafts to be passed.

Figure 4:
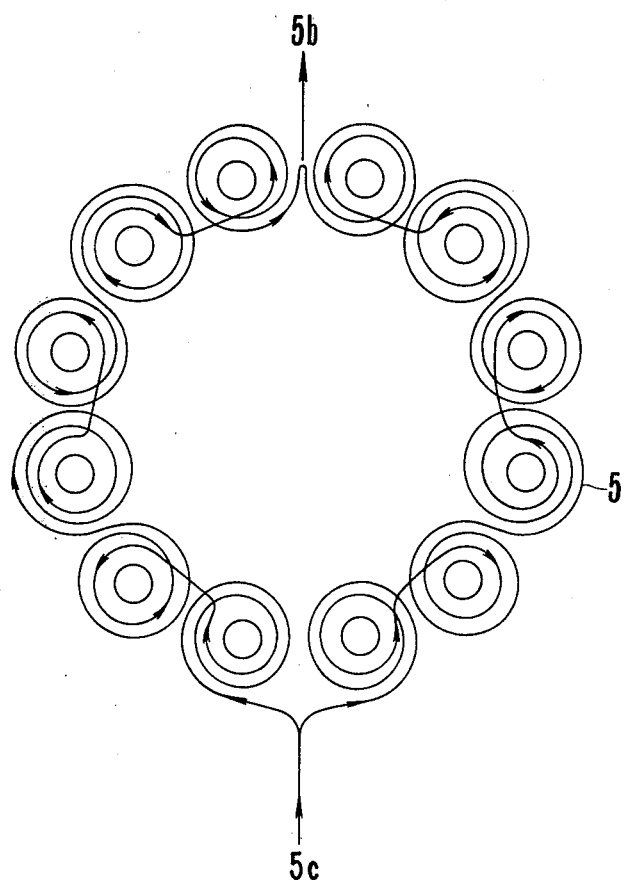
FIG. 4 is a schematic view showing a manner in which the coils are connected to each other.

The coil elements 5 each are of a modified isosceles trapezoid with the shorter and longer bases curved in conformity with the inner and outer diameters of the sector ring 4 and have a hollow core. The half number of coil elements are aligned with the holes 5a for the purpose of passing light and the shafts. As shown in FIG. 4, the coil elements 5 are connected to each other with a pair of lead wires 5c and 5b being taped from the diametrically opposite positions.

Figure 12:
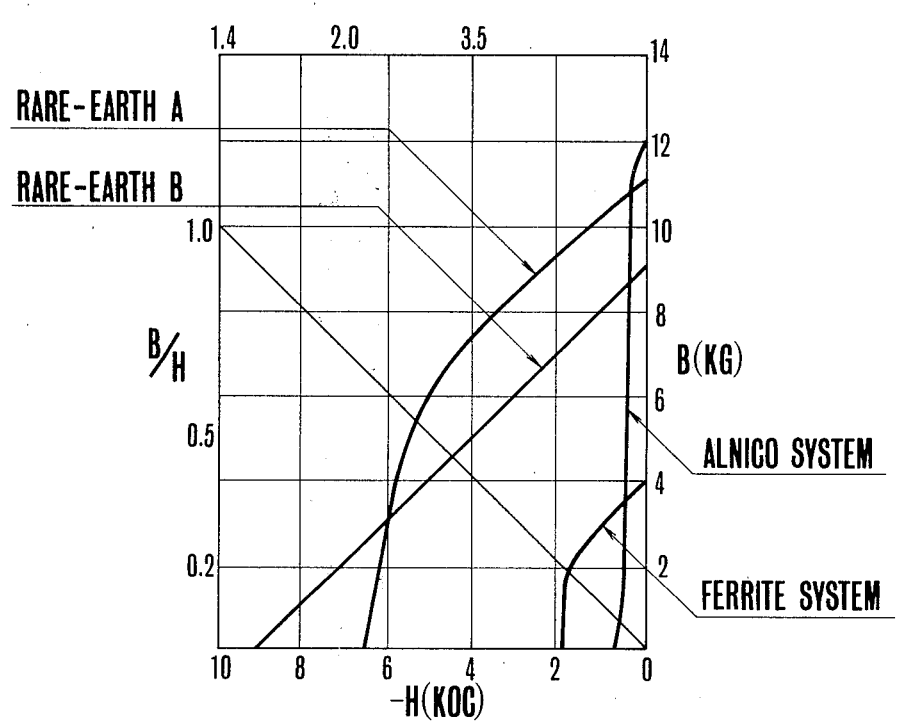
FIG. 12 is a graph of B-H curves for the various magnets including two rare-earth magnets used in the present invention.

The magnet pieces 6 used in this instance are of rare-earth type having a B/H value of 2 to 0.5 with a magnet flux density of 7K to 3K Gauss, so that the shutter can be made thinner and lighter. It is to be noted that as shown in FIG. 12, the rare-earth magnet is very strong as compared with the conventional alnico and ferrite magnets so that the volume of the magnetic system can be minimized. The ones of the curves of FIG. 12 which are largely swelled are for two-rare-earth magnets A and B. When the magnet and yoke are designed to have a B/H value of unity, for example, the flux density takes a value of 5.5 KG for the rare-earth A, 4.5 KG for the rare-earth B, 0.5 KG for the alnico system, and 1.5 KG for the ferrite system. Therefore, it is preferred to use the rare-earth magnet while the B/H=1, or thereabout, from the standpoint of minimizing the size and weight of the shutter. Since the rare-earth magnet in the form of two thin plates facing each other has a higher magnetic flux denisty than that in the form of a single thick plate, the embodiment employs 24 magnet pieces of which twelve are on the cover 2 with the other twelve on the substrate 7 in such an orientation that the two adjacent pieces are opposed to each other in the S-N direction, and that the magnet pieces on the cover 2 face with their Ss and Ns at the Ns and Ss of the magnet pieces on the substrate 7 respectively. Further the magnet pieces 6 are positioned out of alignment with the holes 2a and 7a in the cover 2 and the substrate 7. The magnet pieces are magnetized in the direction parellel to the thickness of the plate as shown in FIG. 3(b).

The substrate 7 has six circumferential cutouts arranged to allow for movement of the sector pins 8, and six holes 7a for passage of light and the shafts described above. Mounted on the substrate 7 are six pivot pins 11 at which are rotatably mounted five shutter blades 9 of the same shape and one shutter blade 10 having an auxiliary diaphragm blade. The substrate 7 further includes a number of holes 7b formed through the wall thereof for the purpose of attaching the shutter to the camera. The material from which the substrate 7 is made is preferably pure iron, constituting part of the yoke of the magnet 6.

The sector pins 8 function to transmit the motion of the sector 4 to the shutter blades 9 and the composite blade 10, mounted on the sector 4 in fixed relation thereto, and are made of a non-magnetic material such as phosphor bronze.

The shutter blades 9 and 10 are pivotal at the pins 11 behind an aperture member 12 to effect the exposure control. The aperture member 12 has a central opening 12a which defines a maximum diaphragm value. When the brightness of an object being photographed is high, the shutter blades 9 and 10 are moved to an intermediate position, serving as a diaphragm of variable opening size.

The blades 9 and 10 are made of a tool steel or plastics each in the form of a thin plate having a high hardness in relation to the weight thereof. The sector pins 8 are drivingly connected to the blades 9 and 10 and are engaged in respective slightly elongated slots 9a and 10b which absorb the difference between the radius of the sector and the distance from the slot 9a or 10a to the pivot pin 11.

The composite blade 10 not only functions in the same manner as the blade 9, but also has the auxiliary diaphragm blade 10a cooperative with an auxiliary aperture 12b of the aperture member 12 to control the intensity of light incident upon a photosensitive element constituting part of an exposure control circuit. Since the auxiliary diaphragm blade 10a is formed in a part of the blade 10, the size of exposure aperture is translated into the size of light metering aperture in a predetermined relationship.

The pivot pins 11 are made of hard metal and are positioned in a common circle in an equally spaced relation to each other.

The aperture plate 12 has at least two holes 12c for engagement with the pivot pins 11 to determine the relative position of the exposure aperture 12a and light metering aperture 12b, and is constructed with a thin steel plate for the purpose of preventing reflection of light at the edge thereof.

Figure 9:
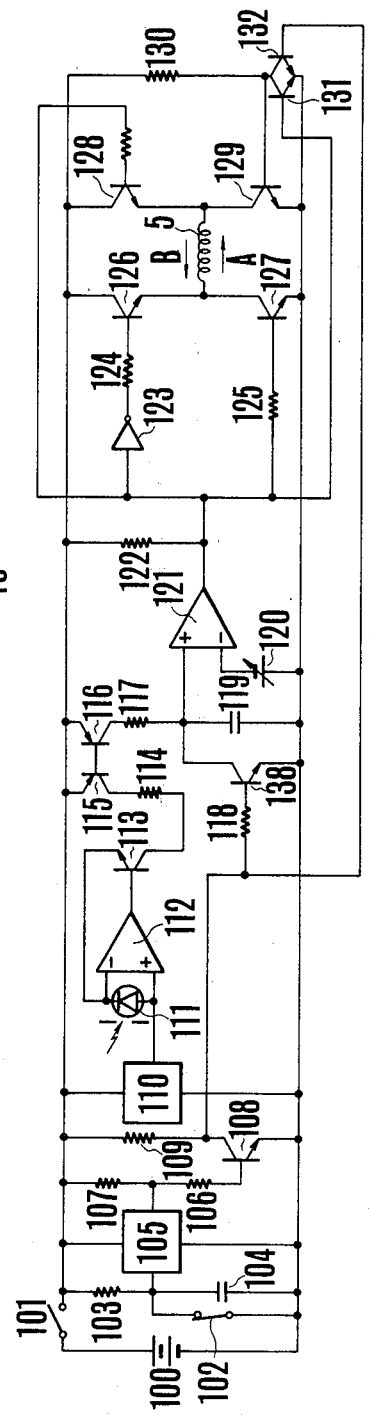
FIG. 9 is an electrical circuit diagram showing an example of a circuit for controlling the operation of the electromagnetic diaphragm shutter of the present invention.

A pair of lead wires 13 are each connected at one of their ends to the leaf springs 1 and at the other of their ends to an electrical circuit of FIG. 9.

Figure 3A:
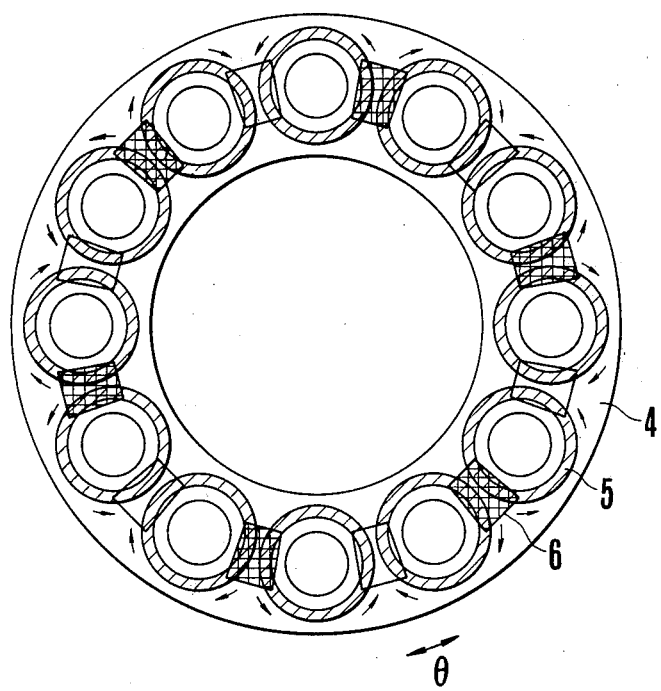
FIGS. 3(a) and 3(b) are schematic views showing an example of the arrangement of coils and permanent magnets, with FIG. 3(a) being a sectional view perpendicular to the axis of the objective lens, and with FIG. 3(b) being a sectional view parallel to the axis.
Figure 3B:
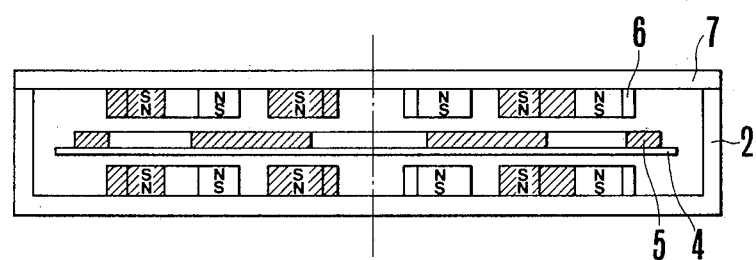

The spatial relationship of the coil elements 5 and the magnet pieces 6 is shown in FIGS. 3(a) and 3(b), where the twelve magnet pieces 6 on the bottom wall of the cover 12 alternate in polarity, N-S, S-N, N-S and so on, while the orientation of polarity of the twelve magnet pieces 6 on the substrate is adjusted relative to those on the cover 2 so that the N and S poles face with the S and N poles respectively.

The center of each of the coil elements 5 is adjusted to an intermediate point between the adjacent two magnet pieces 6. In other words, the legs of each trapezoidal coil which run in the radial direction of the sector ring 4 lie in the magnetic field. The reason why the coil is configured as a trapezoid is to concentrate in the radial direction of the sector ring 4.

When a current is allowed to flow through the coil from the tap 5c to the tap 5b, the directions of current flow through the legs thereof are to the center and away therefrom alternately.

Since the magnetic field of current flowing in the direction of the radius of the sector and the direction of current flow are reversed respectively, the sector is driven to turn by flowing current therethrough. When the current is flowed from the tap 5b to the tap 5c, the sector ring 4 is driven to turn in the reversed direction, as the direction of current is changed, though the direction of the magnetic field is left unchanged.

Figure 13:
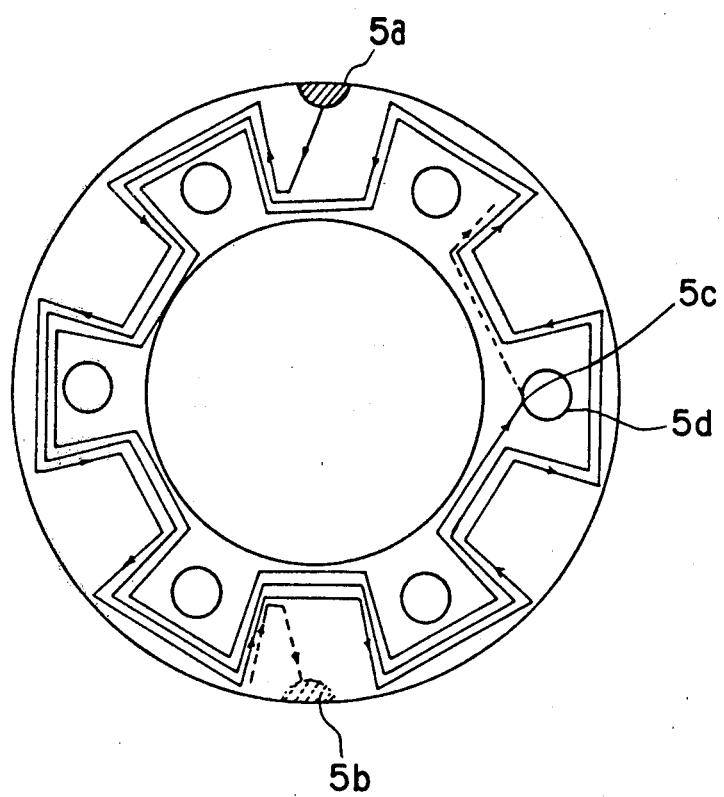
FIG. 13 is a schematic plan view showing a modification of the rotor depicted in FIG. 2.

In FIG. 13, the sector ring and the coil are made from a printed board, and are so arranged that the current in the radial direction of the sector ring 4 flows alternately in the centrifugal direction and in the centripetal direction. The same patterns are made on both sides, and electrically connected through a conductive member provided at the intermediate point 5c. For example, the current flows in the direction shown by the arrow so that the current on both sides flows in the same direction. In order to provide the same pattern on both sides, the intermediate point 5c is positioned at a position turned 90° from the first end 5a and both sides are connected by utilizing the hole 5d through which light or a shaft can pass. In this way, the conductive member is prevented from being conductive to the magnet or yoke (cover or base plate).

The holes in the cover 2, substrate 7 and sector 5 are axially aligned with each other when the sector 5 passes a central point in the range of movement thereof, so that light, shafts and lead wires may be passed through the shutter at the aligned holes. The shafts may be used to connect the front and rear lens assemblies. The light may be used in metering light intensity. Of these, one hole may be used in combination with an opaque cover layer formed in a portion of the sector ring. Further, the sector pins 8 can be mounted by soldering. The coil arrangements used in the embodiment are manufactured by a process comprising the steps of applying a thermoplastic coating to an enamel wire, turning the coated enamel wire to coil elements of cylindrical shape, deforming each coil element to the above-described trapezoid, connecting twelve coil elements for every one shutter on the sector ring, supplying a large current to the coil arrangement at a time to melt the thermoplastic coating by the joule heat of the copper wire, and cooling the coil to solidify the molten thermoplastic coating.

The sector is normally urged by the leaf springs 1 in a direction in which the shutter is closed to prevent accidental opening of the shutter due to vibrations, or the like.

To further improve the stability of the shutter in the closed position, the sector pins may be made of a magnetizable material so that they interact with the magnet pieces and function as a spring of non-linear characteristics.

Figure 10:
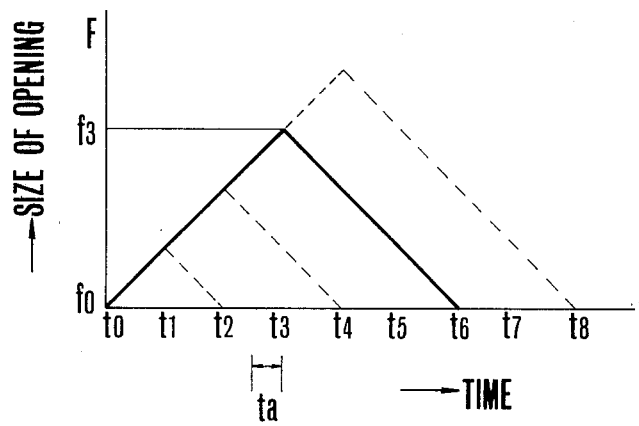
FIG. 10 is a graph showing the manner in which the shutter of FIG. 1 operates when the pair of springs 1 are omitted.

If the leaf springs 1 are omitted, the shutter is caused to open and close at the same speed as shown in FIG. 10. The use of the leaf springs 1 changes such symmetrical opening and closing characteristics of the shutter to those shown in FIG. 11.

Figure 11:
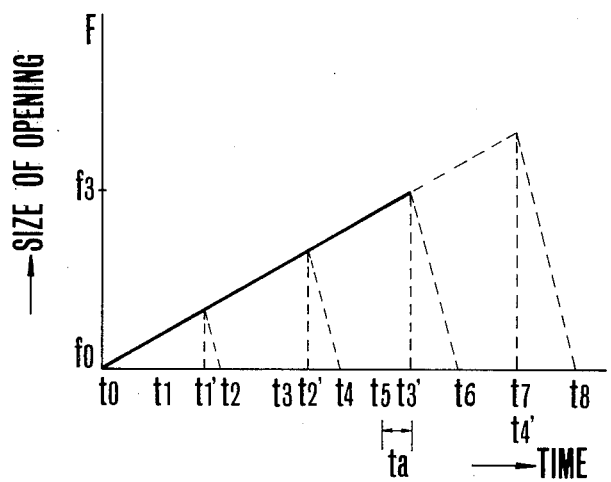
FIG. 11 is a similar graph when the springs 1 are used according to the present invention.

Assuming, for example, a situation in which the shutter is opened to f3 and then closed at a time point t6 with the resultant effective exposure time being t6/2 (=t3), it is found that in the case shown in FIG. 10 where springs 1 are not used, the transition from the opening to the closing occurs at the same point t3, while the addition of the springs 1 shifts the time of transition to t3', seen in FIG. 11. As is evident from the figures, t3'>t3. Let ta denote a time lag from a moment at which the shutter closing signal has been emitted to a moment at which the shutter starts to be closed, and assume that the time lag, ta, is the same in both cases, then the proportion of the ta to t3, or t3' is smaller than when the springs 1 are omitted. And, since t3'>t3, assuming that the absolute value of deviation of the time lag from the prescribed value is the same, it is found that the influence by the deviation is smaller in the case of FIG. 11.

Further, the velocity of closing movement of the shutter is made larger than when the springs are omitted, as the spring force is added to the force exerted by the coil. Therefore, the time lag ta can be reduced by the use of the spring.

Thus, the arrangement of the spring for assisting in closing the shutter minimizes the time lag and the influence of the time lag on the accuracy of exposure control. Such an electromagnetically operated shutter can be advantageously used as the program shutter.

Figure 5:
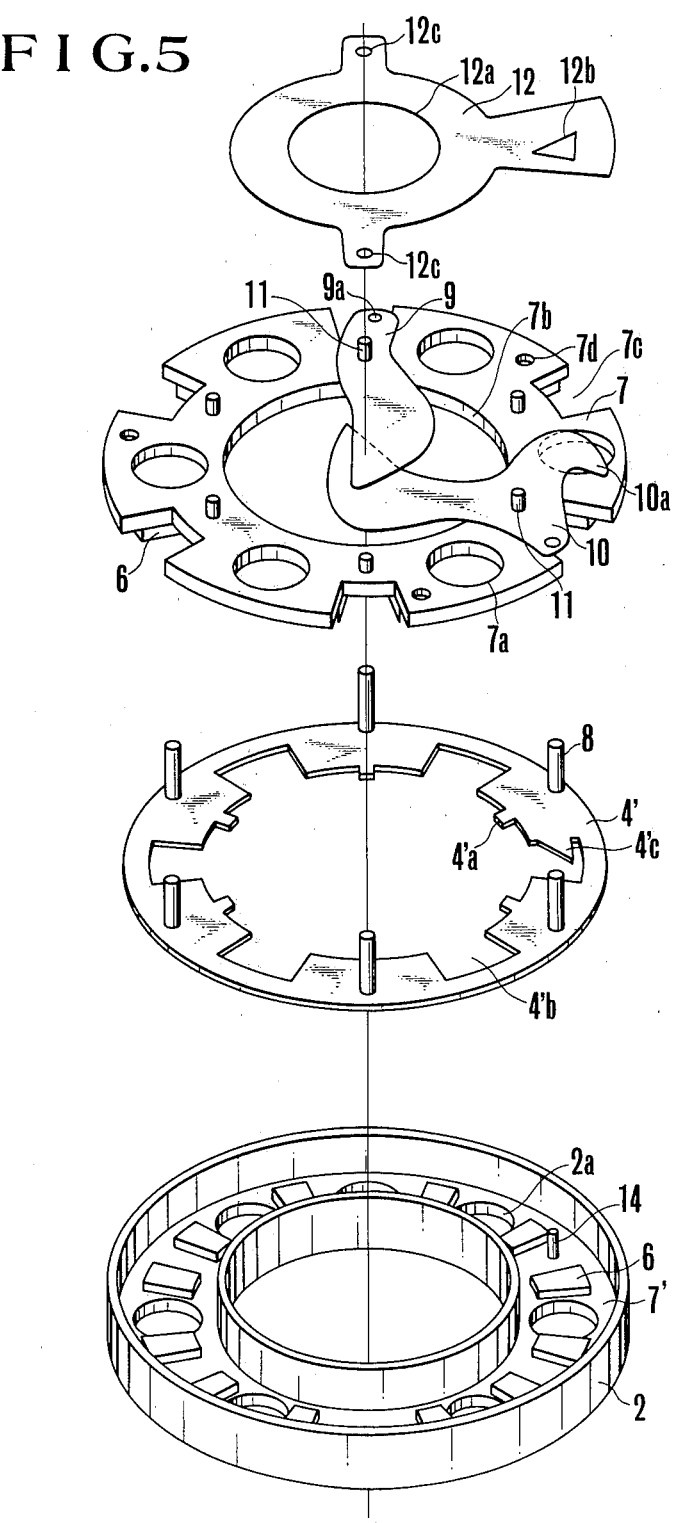
FIG. 5 is an exploded perspective view of a second embodiment of the present invention.

FIG. 5 is an exploded perspective view of a second embodiment of the present invention which is different from the first embodiment shown in FIG. 2 only in that the sector ring 4 of FIG. 2 is modified in shape to that of the ring 4', that instead of using the coil 5 of FIG. 2, a printed pattern on the substrate 4' is employed, and that the lower yoke 7' of FIG. 2 is provided with a stopper pin 14 arranged to engage with a cutout of the above-described sector ring 4'. The other parts similar to those shown in FIG. 2 are therefore denoted by employing the same reference characters.

Figure 6:
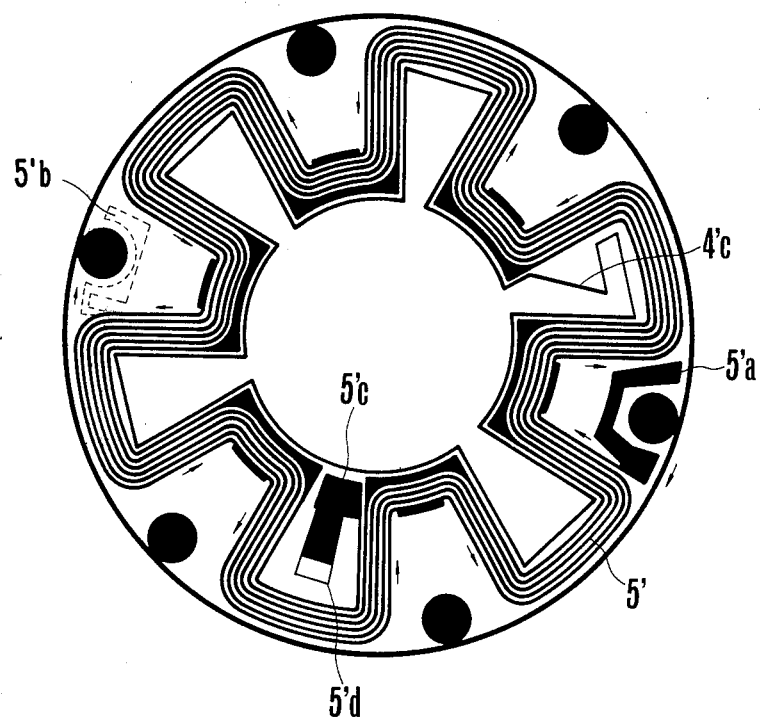
FIG. 6 is a schematic plane view showing an example of the pattern of a printed circuit on the sector ring of FIG. 5.

In FIG. 5, the shutter includes a sector ring 4' movably mounted within the cover 2, and having front and back surfaces provided with printed coil patterns as shown in FIG. 6. The material of which the sector ring 4' is made may be a non-magnetic material or plastics. To reduce the frictional force between the cover 2 and the sector ring 4', there are provided six radially inwardly projected portions 4'a, the inner diameter portions of which abut against the outer periphery of the 5 inner tube of the cover 2. Six sector pins 8 are perpendicularly mounted on the upper surface of the sector ring 4' in the vicinity of the outer diameter thereof by soldering or riveting. The printed coil pattern 5' on the upper surface of the sector ring 4', an example of which is shown in FIG. 6, defines a single conductive path curved in a number of concave and convex loops repeated in the vicinities of the inner and outer diameters of the ring 4' and extending thereacross, and is similar to that on the lower surface of the sector ring 4', with electrical connection thereto being made across the wall thereof. The sector ring 4' is further provided with six cutouts 4'b to be used as an abutment for a stopper and a light path, and to function as a shock absorber, when there is applied thereto a load so large that it is deformed within the elastic range.

The shutter blades 9 and 10 may be made of plastics. In this case, it is recommended that the front surfaces be coated with a metal layer to prevent damage due to the burning by the objective lens. Also, it is possible to form the pivot shafts 11 of plastics by molding together with the shutter blades 9 and 10. The aperture plate 12 of FIGS. 2 and 5 has two holes for use in the adjustment of the position as the above-described pivot pins 11 engage therein, and it is made of a thin steel plate with the provision of a triangular opening 12b for use in light metering, as has been mentioned above. The stopper 14 is mounted on the lower yoke substrate 7' and it is arranged such that upon engagement with one end of the slot 4'b of the sector ring 4', it will stop the sector ring 4' from further excessive rotation when the shutter is opened, so that upon engagement with the opposite end, it will set the sector ring 4' in the shutter fully closed position.

Figure 7:
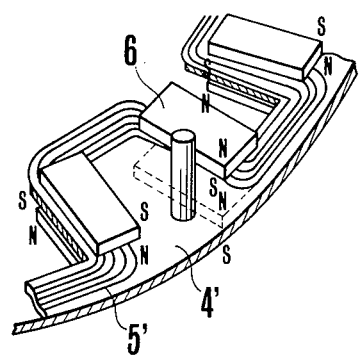
FIG. 7 is a fragmentary perspective view showing the spatial relationship of the pattern of FIG. 6 with the magnet pieces which are mounted on the stationary part.

FIG. 7 shows the spatial relationship of the printed coil patterns on the sector ring 4' with the stationary magnet pieces on the upper and lower yokes. The magnet pieces on the same yoke are oriented so that their poles alternate with each other, and those on the opposite yoke are vertically aligned with the N-S directions coinciding with each other, whereby the vertically paired magnet pieces are caused to form a magnetic field in the space therebetween in which the coil patterns 5' in the sector ring 4' are movable. Now assuming that a current is allowed to flow through the coil patterns 5' from a land 5'a to a land 5'b, the radially directed portions of the coil will conduct current in alternate directions of flow toward the center and away therefrom. Since the poles of the magnetic field induced by the current flowing through the radial portions of the coil are opposite to those of the permanent magnet pieces adjacent thereto, the sector ring 4' is driven to rotate about the optical axis of the objective lens. Then, when the direction of current is reversed, as the direction of magnetic field remains unchanged, the sector ring 4' is caused to change its direction of movement. It is to be noted that, as shown in FIG. 6, the pair of coil patterns printed on the upper and lower surfaces of the substrate 4' are electrically connected to each other at an intermediate point 5'c and are adjusted in position to vertical alignment with each other so that the directions of current flowing through the paths at the same position in the upper and lower patterns coincide with each other. For this purpose, the intermediate point 5'c is located at an angular distance of 90° from the first land 5'a, and one of the holes 5'd for passage of light or shafts is utilized in connecting the upper and lower patterns with each other, thereby giving an additional advantage in that even when a projected portion is formed in the conductive area, no conduction to the magnet or yoke can be established. The cutouts 4'b of the sector ring 4' are brought into alignment with the holes in the upper and lower yokes 7 and 7' when the sector ring 4' takes an intermediate position in the range of movement thereof, thus permitting light, shafts, or lead wires to be passed therethrough. The light may be used in sensing the brightness level, the shafts in connecting the front and rear lens assemblies on the opposite side of the shutter, and the lead wires in being slacked therein.

Figure 8:
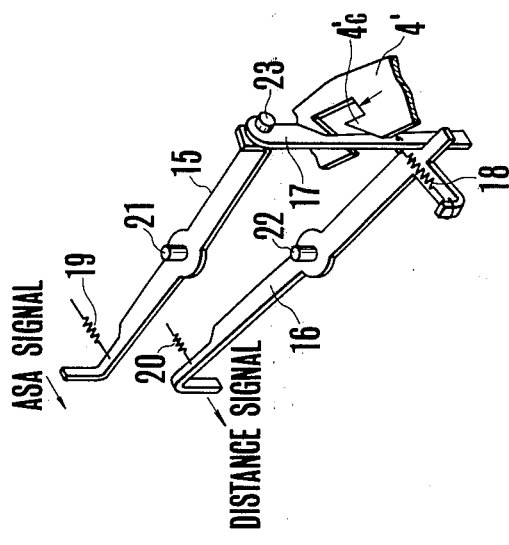
FIG. 8 is a perspective view of the main parts of an example of a mechanical flashmatic device provided in the diaphragm shutter of the present invention.

FIG. 8 shows the main parts of an example of a mechanical flashmatic device associated with the diaphragm shutter of the invention. In this figure, a film speed dependent lever 15 and a distance dependent lever 16 are arranged to cooperate with respective information setting mechanisms (not shown), and are biased by springs 19 and 20, respectively, to turn in clockwise directions about pivot pins 21 and 22 which are vertically aligned to each other. A lever 17 is pivotally mounted on a rectangularly bent portion of the lever 15 and is caused to abut at its free end against the end of the lever 16 under the action of a spring 18. This lever 17 cooperates with a camming surface 4'c provided in the sector ring 4' of the above-described electrically operated diaphragm shutter in such a manner that the amount of rotation of the sector ring 4' is controlled in accordance with the position of the differential lever 17. Thus, the size of shutter opening as defined by the diaphragm is controlled in accordance with the film speed and object distance. To render inoperative the flashmatic mechanism, the operator needs to manipulate a lever (not shown), whereby the distance dependent lever 16 is turned to take the lever 17 out of engagement with the camming surface 4'c.

FIG. 9 is an electrical circuit diagram showing an example of a control circuit for the electromagnetically operated diaphragm shutter of the present invention which comprises: an electrical power source or battery 100; a normally open main switch 101 arranged to closed when the release button is depressed to a first stroke; and a normally closed release switch 102 arranged to be opened when the release button is depressed from the first to the second stroke, or when the automatic focusing has been completed. A resistor 103 and a condenser 104 constitute a time constant circuit. 105 is a timer circuit for preventing chattering when the release is actuated. A constant voltage circuit 110 is provided as well as a photosensitive element 111 for light measurement, in this instance, SPC. The SPC is connected across two input terminals of an operational amplifier 112 and a switching transistor 113 is provided for short-circuiting a condenser 119 with its collector connected to the non-inversion input terminal of a comparator 121. Connected to the inversion input terminal of the comparator 121 is a variable voltage source 120 which produces a signal representative of the ASA sensitivity of the film. 123 is an inverter, and 126, 127, 128, and 129 are transistors for controlling the direction of current to the coil 5 or 5'.

The operation of the circuit of FIG. 9 will next be explained. When the main switch 101 is first thrown, since the release switch 102 is closed, the output of the timer circuit 105 is of low level L, and the transistor 108 remains turned off. Therefore, since the transistor 133 is ON, the voltage as the non-inversion input terminal of the comparator 121 is almost zero, causing the comparator 121 to produce an output of L level, and therefore causing the coil control transistors 127 and 128 to be in the OFF state. Again, since the above-described transistor 108 is in the OFF state, the switching transistor 132 is turned on, causing the coil control transistor 129 to be turned off also. Though the coil control transistor is ready to become conducting, since the other coil control transistors 127, 128, and 129 are non-conducting, no current flows through the coil 5 or 5'. Thus, the electromagnetic drive device is not yet rendered operative.

Then, when a release is actuated, the above-described release switch 102 is opened. In a predetermined time interval dependent upon the resistor 103 and condenser 104, the timer circuit 105 is turned on to change its output from L to the high H level at which the transistor 108 is turned on. Such conduction of the transistor 108 causes the transistors 132 and 133 to be turned off. Up to this step, the output of the comparator 121 is not yet changed from the L level, thus maintaining the transistor 131 in the OFF state. Therefore, the coil control transistor 129 is turned on and, with the coil control transistor 127 remaining OFF, the coil control transistor 126 is turned on, causing a current to flow through the coil 5, or the coil pattern 5' in a forward direction indicated by arrow A. Thus, the shutter starts to open.

At the same time, light starts to enter through the auxiliary aperture opening 12b, being incident upon the SPC 111. Therefore, a current of intensity proportional to the object brightness is allowed to flow into the condenser 119. When the voltage across the condenser 119 has reached a level dependent upon the set value of ASA sensitivity, the comparator 121 changes its output from the L to the H level. Therefore, the coil control transistors 127 and 128 are turned on, while the coil control transistor 126 is turned off by the output of the inverter. The switching transistor 131 is also turned on, so that the coil control transistor 129 is also turned off. Thus, the supply of current in direction A is cut off and current in direction B is allowed to flow through the coil 5, or the coil pattern 5', causing a closing of the shutter to be initiated.

In the operation of the diaphragm shutter of the invention, actuation of release leads to a buildup of current in the coil 5, or the coil pattern 5' from the first tap 5a, 5'a to the second tap 5b, 5'b. Since the coil 5 and the magnet 6 are arranged as shown in FIGS. 3 and 4, or the coil pattern 5' and the magnet 5 are correlated to each other as shown in FIG. 7, the magnetic flux due to the current components flowing through the radial paths of the coil 5, or coil pattern 5' on the sector ring 4, 4' interacts with the magnetic field to exert a force in the tangential direction of the circle of the sector ring. A plurality of combinations of radial currents and magnetic fields alternate the directions of current and the directions of magnetic fields in reversed relation to each other so that the sector ring is driven to rotate. Such rotation of the sector ring is transmitted through the sector pins 8 to move the shutter blades 9 and 10. As the shutter blade 10 is being moved, the size of the opening provided by the auxiliary aperture 12b and the auxiliary blade 10a is increased with increase in the amount of light integrated by the photosensitive element 111. When a proper exposure value is attained, the direction of current is reversed, flowing from the second to the first tap. Thus, the shutter is closed.

It is noted that both terminal ends of movement of the shutter are defined by the stopper 14 engaging with the respective parts of the sector ring.

The sector ring is normally urged by the springs 1 which also serve as the lead wires in a direction in which the shutter is closed, whereby accidental opening of the shutter is prevented when jiggles or vibrations are introduced into the camera.

When an exposure is to be made in the flash mode, the mechanical flashmatic device is rendered operative by manipulating the knob (not shown), whereby the distance dependent lever 16 is made free to move. Thereupon, settings of the object distance and the film speed are mechanically summed up to determine the position of the differential lever 17 which is translated to a proper diaphragm value suited for flash photography as the camming surface of the sector ring abuts thereagainst.

The shutter of the above-described construction has the following advantages:

(1) When being opened, the electromagnetic force minus the spring force is effected, and when being closed, the electromagnetic force plus the spring force results so that the opening speed is slower than the closing speed to facilitate an improvement in the accuracy of shutter control.

(2) The driving torque is directly applied to the sector so that there is no loss in the transmission of force.

(3) The coil can be made thinner in the axial direction so that the thickness of the shutter can be reduced with increase in the strength of the magnetic field.

(4) The coil is restrained from axial movement so that the shutter can be made thinner.

(5) No pumping effect is produced during the operation so that there is no need to provide air windows and so that a dustproof cover may be used. The lack of air motion allows little dust to enter the interior.

(6) The weight of the sector is uniformly distributed over the entire area thereof so that shock on the camera does not result in accidental rotation of the sector by inertia, and thus there is no possibility of causing the shutter to be opened.

(7) As the sector is directly driven, the mechanism is simplified to such a large extent that the time lag from the occurrence of the closing control signal to the initiation of the closing of the shutter can be reduced to as small as 1.5 milliseconds, whereby it is made possible to realize the real time light metering followed by exposure control (by the use of the light reflected from the film surface).

(8) The use of a rare-earth magnet enables a strong magnetic field to be obtained and the weight to be reduced.

(9) The members constituting the shutter are small in number, stable against damage, and easily assembled.

The advantages derived from the provision of the holes in the cover 2, substrate 7 and sector 4 in alignment with each other are:

(10) The hole aligned with the air core of the coil may be used in establishing a light path for the auxiliary diaphragm. It may otherwise be used in passing a shaft for connecting the front and rear groups of the objective lens.

(11) The sector with the holes reduces its weight so much that its responsiveness is faster.

(12) The cover and substrate with their holes contribute to a reduction in the weight of the shutter.

The advantages derived from the use of the printed plate are:

(13) As the gap is thinned, the magnetic field can be made stronger.

(14) The auxiliary diaphragm may be formed in a portion of the printed plate to control the exposure, while all the shutter blades may be made identical in shape to each other.

(15) The printed plate may be formed with certain copper areas left behind to be later used in soldering the sector pins thereon.

The advantages derived from the use of resilient lead wires in retaining the sector are:

(16) Even a great number of repeated bendings does not result in breakage thereof.

(17) There is no need for space to accommodate the otherwise resulting slack of the lead wires.

(18) It will prevent the shutter from being left open.

The advantage derived from the use of a thermoplastic material in solidifying the coil is:

(19) The otherwise necessary material core can be omitted to assist in reducing the weight of the drive member or sector to speed up responsiveness.

The advantages derived from the opposite location of a pair of lead wire taps across the diameter of the sector are:

(20) The lead wire can be constructed in the form of leaf springs.

(21) The patterns on the upper and lower surfaces of a printed type sector can be made identical to each other so that the two lands can be located nearest to the outer diameter of the sector as the taps are most easily connected thereto.

(22) The thin movable members are so strong and so hard in directions parallel to the plane thereof that the stopper can effectively act thereon when the shutter is fully opened.

(23) The use of a lightweight material such as a non-magnetic metal plate or plastics in making up the movable members remarkably reduces the consumption of electrical energy necessary to operate the shutter.

While specific embodiments of the invention have been shown and described in detail to illustrate the application of the inventive principles, it will be understood that the invention may be embodied otherwise without departing from such principles.

What is claimed is:

1. An electromagnetically operated diaphragm shutter including:
   (a) a plurality of shutter blades;
   (b) a sector ring drivingly connected to said shutter blades and operative upon rotation thereof to actuate said shutter blades to block and unblock a photo-taking light path;
   (c) permanent magnet members oriented relative to said sector ring to form a magnetic field having a direction parallel to the optical axis of an objective lens;
   (d) electrically conductive members fixedly mounted on said sector ring and arranged upon supply of a current thereto to effect movement of said ring;
   (e) aperture means provided through the wall of said sector ring to form a light metering optical path, said aperture means being located out of axial alignment with said conductive members on said sector ring; and
   (f) diaphragm means positioned in the light metering optical path, with at least one of said shutter blades serving as said diaphragm means, and with the size of an opening defined by said diaphragm means being correlated to the size of an aperture opening defined at any time by said shutter blades.

2. An electromagnetically operated diaphragm shutter according to claim 1, wherein said sector ring is provided with additional aperture means arranged to compensate for unevenness of weight distribution of said sector ring due to the provision of said aperture means in said sector ring.

3. An electromagnetically operated diaphragm shutter according to claim 2, further including a stationary part and a stopper fixedly mounted on said stationary part of said shutter and arranged upon abutment against a side of said aperture means in said sector ring to define at least one terminal end of the path of movement of said sector ring.

4. An electromagnetically operated diaphragm shutter according to claim 2, operatively associated with a camera including a flash device and lever means responsive to film sensitivity information and object distance information, said shutter further including a camming surface formed in a portion of said aperture means and cooperative with said lever means for adjusting the position of said sector ring in accordance with said film sensitivity information and said object distance information.

5. An electromagnetically operated diaphragm shutter according to claim 1, wherein said conductive members comprise at least one coil member defining an air core formed on said sector ring, said coil member being arranged so that said light metering optical path passes through the air core of said coil member.

6. An electromagnetically operated diaphragm shutter according to claim 1, wherein said conductive members comprise a printed coil pattern formed on said sector ring.

7. An electromagnetically operated diaphragm shutter according to claim 6, wherein said printed coil pattern is formed on the upper and lower surfaces of said sector ring with the same pattern.

8. An electromagnetically operated diapragm shutter according to claim 1, wherein at least one of said shutter blades and said sector ring is composed of a non-magnetic material.

9. An electromagnetically operated diaphragm shutter according to claim 8, wherein the front surface of each of said shutter blades is coated with a metal layer.

10. An electromagnetically operated diaphragm shutter according to claim 8 in which the conductive members are fixed to the sector ring by thermoplastic material and covered with said thermoplastic material.

11. An electromagnetically operated exposure control device comprising:
   (a) a plurality of blades;
   (b) a rotor drivingly connected to said blades and operative upon rotation thereof to actuate said blades to control the amount of light passing through a photo-taking light path;
   (c) electrically conductive members fixedly mounted on both sides of said rotor;
   (d) a magnetic member oriented relative to said rotor to form a magnetic field having a predetermined direction relative to said electrically conductive members; and (e) a plurality of holes provided through the wall of said rotor, said holes being located symmetrically at positions other than the positions of said conductive members on said rotor, said conductive members on both sides of said rotor being connected with each other at least at one of said holes.

12. A device according to claim 11, wherein one of said plurality of holes defines a light metering optical path extending therethrough.

13. A device according to claim 11, wherein said plurality of holes are arranged to correct uneven weight distribution of said rotor.

14. A device according to claim 11 wherein said conductive members include a printed circuit coil pattern formed on said rotor.

15. A device according to claim 13 wherein said magnetic member is a permanent magnet.

16. A device according to claim 13 wherein said plurality of holes are arranged symmetrically in relation to the center of rotation of said rotor.

17. A device according to claim 11 wherein said electrically conductive members are arranged around the center of rotation of said rotor closer thereto and away therefrom in a wave-like fashion relative to the center of rotation.

18. A device according to claim 11 wherein said conductive members are arranged to encompass the center of rotation of said rotor without overlapping each other.

19. A device according to claim 11 wherein said device is a diaphragm shutter device.

20. A device according to claim 13 wherein a hole is provided in the center of rotation of said rotor.

21. A device according to claim 20 wherein said photo-taking light path extends through said hole provided in the center of rotation of said rotor.

22. A device according to claim 21 wherein the center of rotation of said rotor coincides with said photo-taking light path.

23. An electromagnetically operated exposure control device comprising:
(a) a plurality of blades;
(b) a rotor drivingly connected to said blades and operative upon rotation thereof to actuate said blades to control the amount of light passing through a photo-taking light path;
(c) electrically conductive members fixedly mounted on both sides of said rotor;
(d) a magnetic member oriented relative to said rotor to form a magnetic field having a predetermined direction relative to said electrically conductive members;
(e) a plurality of holes provided through the wall of said rotor, said holes being located symmetrically at positions other than the positions of said conductive members on said rotor, said conductive members on both sides of said rotor being connected with each other at least at one of said holes; and
(f) a member which is provided with an aperture for an auxiliary stop, said member being secured to the exposure control device, said auxiliary stop aperture being arranged to overlap one of said plurality of holes.

24. A device according to claim 23 wherein there is provided an auxiliary stop member which is capable of covering said aperture provided for the auxiliary stop.

25. A device according to claim 24 wherein the size of an opening defined by said auxiliary stop member is correlated to the size of an opening defined by said blades.

26. A device according to claim 25 wherein said auxiliary stop member is arranged to be displaced in accordance with displacement of said blades.

27. A device according to claim 26 wherein at least one of said blades also serves as said auxiliary stop member.

28. A device according to claim 25 wherein a part of said rotor is arranged to serve as said auxiliary stop member.

29. An electromagnetically operated exposure control device comprising:
(a) a plurality of blades;
(b) a rotor drivingly connected to said blades and operative upon rotation thereof to actuate said blades to control the amount of light passing through a photo-taking light path;
(c) electrically conductive members fixedly mounted on said rotor, said conductive members being arranged to encompass the center of rotation of said rotor in a wave-like fashion relative to the center of rotation, one being disposed closer thereto and another further away therefrom;
(d) a magnetic member oriented relative to said rotor to form a magnetic field having a predetermined direction relative to said electrically conductive members; and
(e) a plurality of cutouts provided in the wall of said rotor located along the pattern of said wave-like arrangement of said conductive members but without being in contact with said conductive members.

30. A device according to claim 29 wherein one of said plurality of cutouts has a light metering optical path defined through the inside thereof.

31. A device according to claim 29 wherein said plurality of cutouts are arranged to correct uneven weight distribution of said rotor.

32. A device according to claim 29 wherein said conductive members include a printed circuit coil pattern formed on said rotor.

33. A device according to claim 29 wherein said magnet is a permanent magnet.

34. A device according to claim 29 wherein said plurality of cutouts are arranged symmetrically in relation to the center of rotation of said rotor.

35. A device according to claim 29 wherein said conductive members are arranged to encompass the center of rotation of said rotor without overlapping each other.

36. A device according to claim 29 wherein said device comprises a diaphragm shutter device.

37. A device according to claim 29 wherein a hole is provided at the center of rotation of said rotor.

38. A device according to claim 37 wherein said photo-taking light path extends through said hole provided in the center of rotation of said rotor.

39. A device according to claim 38 wherein the center of rotation of said rotor coincides with said photo-taking light path.

40. A device according to claim 29 further including a member which is provided with an aperture for an auxiliary stop, said member being secured to the exposure control device, said auxiliary stop aperture being arranged to overlap one of said plurality of cutouts.

41. A device according to claim 40 wherein there is provided an auxiliary stop member which is capable of covering said aperture provided for the auxiliary stop.

42. A device according to claim 41 wherein the size of an opening defined by said auxiliary stop member is correlated to the size of an opening defined by said blades.

43. A device according to claim 42 wherein said auxiliary stop member is arranged to be displaced in accordance with displacement of said blades.

44. A device according to claim 43 wherein at least one of said blades also serves as said auxiliary stop member.

45. A device according to claim 42 wherein a part of said rotor is arranged to serve as said auxiliary stop member.

46. An electromagnetically operated diaphragm shutter including:
(a) a plurality of shutter blades;
(b) a rotor drivingly connected to said shutter blades and operative upon rotation thereof to actuate said shutter blades to block and unblock a photo-taking light path;
(c) electrically conductive members fixedly mounted on said rotor;
(d) a magnetic member oriented relative to said rotor to form a magnetic field having a predetermined direction relative to said electrically conductive members;
(e) a cutout provided through the wall of said rotor to permit a light metering optical path to extend therethrough, said cutout being located at positions other than the position of said conductive members on said rotor;
(f) a member provided with an aperture for an auxiliary stop, said member being fixedly attached to said shutter, and said aperture being arranged to overlap said cutout provided in said rotor; and
(g) diaphragm means positioned in the light metering optical path, said diaphragm means being arranged to define an opening of a size correlated to the size of an opening defined by said shutter blades.

47. A shutter according to claim 46 wherein said rotor is provided with an additional cutout arranged to compensate for unevenness of weight distribution of said rotor by virtue of the provision of said cutout in said rotor.

48. A shutter according to claim 47 wherein said cutouts are arranged symmetrically in relation to the center of rotation of said rotor.

49. A shutter according to claim 46 wherein said diaphragm means is arranged to be displaced in accordance with displacement of said blades.

50. A shutter according to claim 46 wherein at least one of said blades also serves as said diaphragm means.

51. A shutter according to claim 46 wherein a part of said rotor is arranged to serve as said diaphragm means.

52. A shutter according to claim 47 further including a stationary part and a stopper fixedly mounted on said stationary part of said shutter and arranged upon abutment against the side of one of said cutouts in said rotor to define at least one terminal end of the path of movement of said rotor.

53. A shutter according to claim 47, said shutter being operatively associated with a camera including a flash device and lever means responsive to film sensitivity information and guide number information of said flash device, said shutter further including a camming surface formed in a portion of one of said cutouts and cooperative with said lever means for adjusting the position of said rotor in accordance with said film sensitivity information and said guide number information of said flash device.

54. A shutter according to claim 46 wherein said conductive members include a printed circuit coil pattern formed on said rotor.

55. A shutter according to claim 54 wherein said printed circuit coil pattern is formed on the upper and lower surfaces of said rotor with the same pattern.

56. A shutter according to claim 46 wherein said electrically conductive members are arranged around the center of rotation of said rotor closer thereto and away therefrom in a wave-like fashion relative to the center of rotation.

* * * * *